United States Patent [19]

Yamamoto et al.

[11] Patent Number: 5,041,919
[45] Date of Patent: Aug. 20, 1991

[54] IMAGE PROCESSING APPARATUS

[75] Inventors: Haruo Yamamoto; Masaya Fujimoto; Shinobu Satonaka; Tsukasa Matsushita, all of Osaka, Japan

[73] Assignee: Mita Industrial Co., Ltd., Osaka, Japan

[21] Appl. No.: 442,820

[22] Filed: Nov. 29, 1989

[30] Foreign Application Priority Data

Nov. 29, 1988 [JP] Japan .................................. 63-301881
Nov. 29, 1988 [JP] Japan .................................. 63-301882

[51] Int. Cl.⁵ ............................................. H04N 1/40
[52] U.S. Cl. ...................................... 358/449; 358/404
[58] Field of Search ............... 358/449, 444, 404, 488, 358/447

[56] References Cited

U.S. PATENT DOCUMENTS 4,772,955 9/1988 Kuranayashi et al. ............... 358/449
4,899,227 2/1990 Yamada ................................. 358/449

Primary Examiner—Edward L. Coles, Sr.
Attorney, Agent, or Firm—Jordan and Hamburg

[57] ABSTRACT

An image processing apparatus wherein a document on a document support table and an optical system are moved relative to each other for scanning to read the image of the document as a density signal, and the read signal is processed as required, the apparatus comprising a document mat so colored that when the document support table is covered with the mat, the read signal represents an intermediate color, discriminating device for judging whether the density signal represents the intermediate color to produce a binary signal, a memory having a memory capacity of 1/n based on the density signal, a write control for causing the binary signal to be written in the memory device in synchronism with the scanning movement, and apparatus for determining the size of the document from the contents of the memory device.

18 Claims, 10 Drawing Sheets

(a)

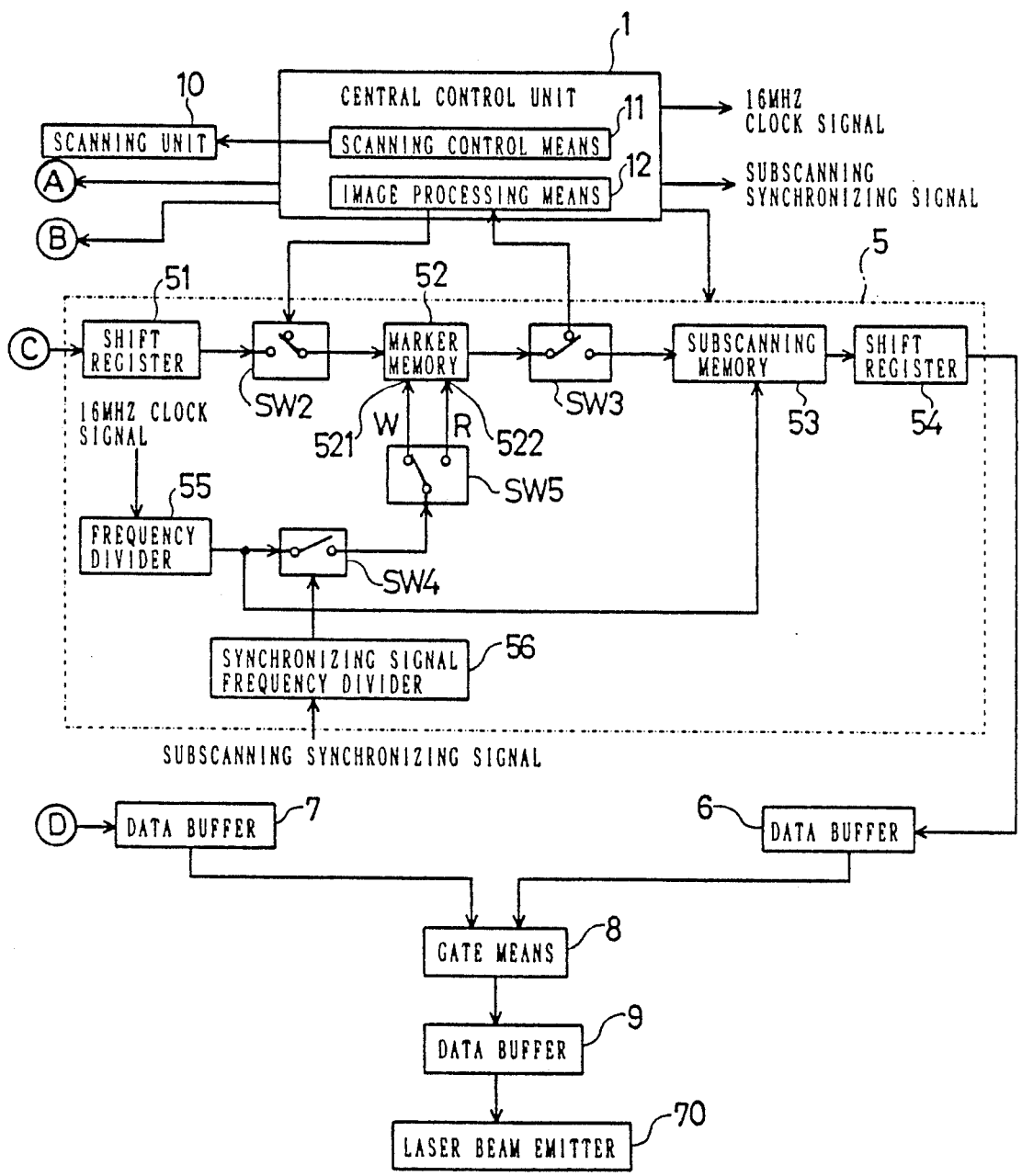

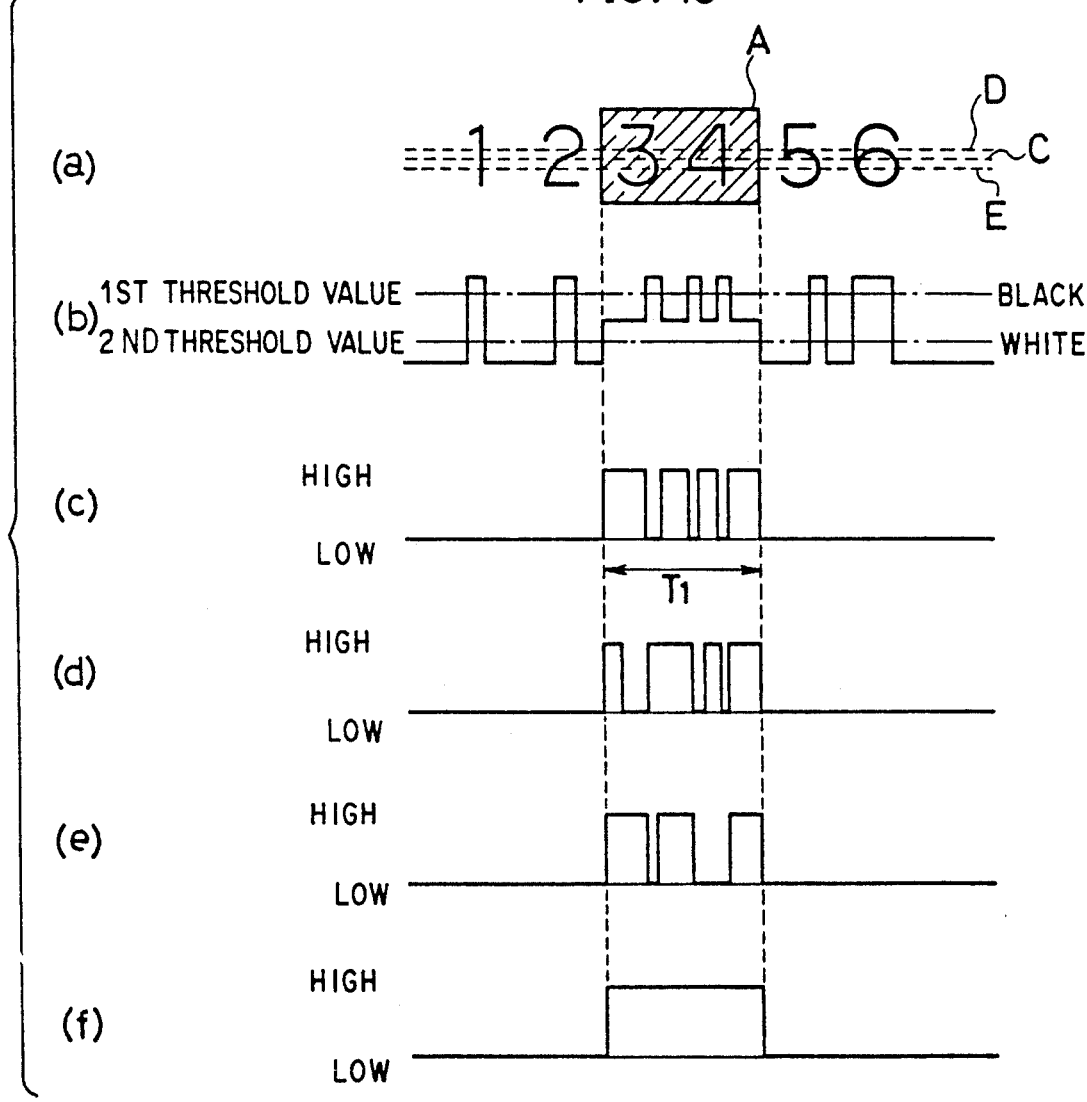

IMAGE PROCESSING APPARATUS

BACKGROUND OF THE INVENTION AND RELATED ART STATEMENT

The present invention relates to image processing apparatus for use in copying machines, facsimile systems or the like for scanning a document on a contact glass plate or like document support table with an optical system while moving the document and the optical system relative to each other to read an image of the document and processing the resulting image signals as required, and more particularly to image processing apparatus adapted to detect the size of documents, modify edge areas of documents and discriminate marked areas on documents.

As disclosed in Unexamined Japanese Patent Publication SHO 61-6636, image processing apparatus adapted to detect the size of documents or perform other processes are known in which the image signals obtained by scanning a document with an optical system are directly stored in memory means temporarily, and the desired process is executed based on the stored signals.

Further Unexamined Japanese Patent Publication SHO 62-2778 discloses an image processing apparatus wherein the image signals obtained by scanning a document on a document support table with an optical system are temporarily stored as they are in memory means, and the position and size of the document on the table are detected from the data obtained by scanning all the addresses of the memory means successively at a specified interval.

The conventional image processing apparatus described above necessitate memory means of great capacity since all the signals representing a document image are to be stored and requires a long period of time for image processing since the memory means also is to be scanned successively.

On the other hand, Unexamined Japanese Patent Publications SHO 55-73041, SHO 57-119380, SHO 59-139486, SHO 62-239662 and SHO 62-239663 propose image processing apparatus adapted to detect image density signals corresponding to the light reflected from a document using a photodetector, discriminate a specified area on the document marked with a marking pen or the like based on the density signals, and process the marked area on the document based on the result of discrimination.

These conventional apparatus include those adapted to discriminate the marked area with use of a color filter on the photodetector to alter the sensitivity level, or with use of a color sensor as the photodetector. With such apparatus, the photodetector or sensor unit is complex in construction and costly. The apparatus disclosed in the publication SHO 62-239662 or SHO 62-239663 is adapted to detect a mark at a specific position on the document and process the image in an area on the document corresponding to this position, so that characters, diagram or the like at an optional position on the document can not be processed. The apparatus of the publication SHO 59-139486 discriminates a marked area on the document simultaneously with the scanning operation of the optical system and is therefore adapted for high-speed processing, whereas the image processing to be performed is limited only to cutout processing. The apparatus further requires a memory of large capacity for storing the mark signals obtained from the document for the entire area of the document.

SUMMARY OF THE INVENTION

The main object of the present invention is to overcome the foregoing problems and to provide an image processing apparatus adapted for various modes of image processing.

The present invention provides an image processing apparatus wherein a document placed on a document support table and an optical system are moved relative to each other for scanning to read the image of the document as a density signal, and the read signal is processed as required, the apparatus comprising a document mat so colored that when the document support table is covered with the mat, the read signal represents an intermediate color, discriminating means for judging whether the density signal represents the intermediate color to produce a binary signal, memory means having a memory capacity of 1/n based on the density signal, write control means for causing the binary signal to be written in the memory means in synchronism with the scanning movement, and means for determining the size of the document from the contents of the memory means.

The image processing apparatus of the present invention further includes first discriminating means for detecting whether the document mat is in a closed state covering the document support table or in an open state not covering the table and judging whether the density signal represents the intermediate color to produce a binary signal, and second discriminating means for judging whether the density signal represents the blackest color exceeding the density of the document area to produce a binary signal, the output of the first discriminating means being fed to the memory means having the memory capacity of 1/n when the document mat is in the closed state or alternatively the output of the second discriminating means being fed to the memory means when the document mat is in the open state.

Further the image processing apparatus of the invention is adapted to calculate the size of the document from the stored contents of the memory means having the memory capacity of 1/n and having the image signal stored therein and also from prestored data as to sizes of documents.

With the apparatus described above, the density signal obtained by scanning is converted to a binary signal and stored in a data amount of 1/n, so that the memory means can be of a greatly reduced capacity. Furthermore, the memory means can be scanned in a correspondingly shortened period of time for determining the document size to result in a shortened processing time. The data as to the document size can be utilized for scanning the memory means, whereby the image processing time can be further shortened.

The image processing apparatus of the present invention further includes signal rewriting means for rewriting a portion of the contents of the memory means with the capacity of 1/n and having the binary signal stored therein which portion corresponds to an area of specified width inside the edge of the document.

The invention further provides an image processing apparatus wherein a document placed on a document support table and an optical system are moved relative to each other for scanning to read the image of the document as a density signal, and the read signal is processed as required, the apparatus comprising a document mat so colored that when the document support table is covered with the mat, the read signal represents an intermediate color, control means for effecting the scanning operation twice, discriminating means for judging whether the density signal obtained by the first scanning operation represents the intermediate color to produce a binary signal, memory means having a memory capacity of 1/n based on the density signal, write control means for causing the binary signal to be written in the memory means in synchronism with the scanning operation, signal rewriting means for rewriting a portion of the contents of the memory means corresponding to an area of specified width inside the edge of the document, read control means for reading out the stored contents of the memory means in synchronism with the second scanning operation, binary conversion means for producing a binary signal from the density signal obtained by the second scanning operation as separated into a black signal and a signal other than the black signal, and gate means for blocking the density signal obtained by the second scanning operation while the memory contents for the intermediate color signal area are being read out and permitting the passage of the output of the binary conversion means while the memory contents for the area of the specified width inside the document edge are being read out.

The construction described above permits use of memory means of reduced capacity and assures a reduced processing time like the apparatus described previously.

The edge processing made for the area of specified width inside the document edge obviates various adverse effects that would result, for example, from disagreement in scanning position between the first and second scanning operations, whereby a satisfactory image of the document can be reproduced.

The invention further provides an image processing apparatus wherein a document placed on a document support table and an optical system are moved relative to each other for scanning to read the image of the document as a density signal, and the read signal is processed as required to obtain an output and form an image, the apparatus comprising control means for effecting the scanning operation twice, discriminating means for judging whether the density signal obtained by the first scanning operation represents a marking intermediate color to produce a binary marker signal, memory means having a memory capacity of 1/n based on the density signal, write control means for causing the marker signal to be written in the memory means in synchronism with the scanning opeation, modifying means for modifying the marker signal stored in the memory means to a marker signal corresponding to the intermediate color over the entire mark area of the memory means, read control means for reading out the modified contents of the memory means and the interpolated singal in synchronism with the second scanning opeation, and gate means for outputting therethrough the density signal obtained by the second scanning opeation according to the marker signal read out by the read control means.

With the construction described above, the marked area on the document is discriminated from the digital signal obtained by the first scanning operation to obtain a binary signal, while the marker signal is thinned out to 1/n, permitting the use of memory means of reduced capacity. Nevertheless, the data as to the marked area can be reproduced properly. Moreover, since the digital signal obtained by the second scanning operation is output as it is, prints can be obtained with varying densities.

The above and other objects, features and advantages of the present invention will become more apparent from the following detailed description with reference to the accompanying drawings.

BRIEF DESCRIPTION OF THE DRAWINGS

FIG. 15 is a diagram showing examples of density signals for illustrating a fifth embodiment of image processing apparatus of the invention.

DESCRIPTION OF THE PREFERRED EMBODIMENTS

Figure 2:
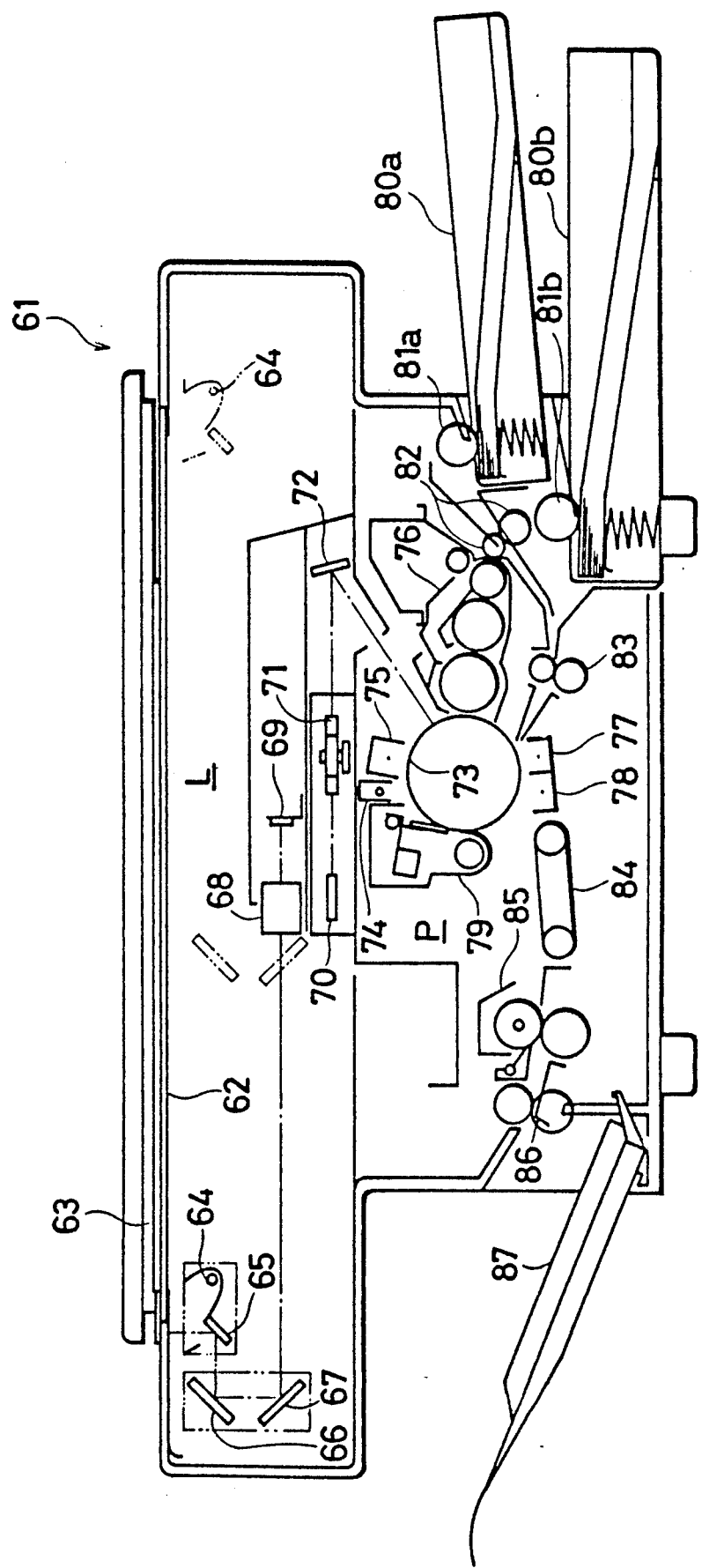
FIG. 2 is a side elevation in section of a digital copying machine to which the invention is applied.

FIG. 2 is a side elevation in section of a digital copying machine to which the present invention is applied. With reference to the drawing, the copying machine 61 has a contact glass plate 62 and a document mat 63 on its top and is internally provided with an optical system L and image forming means P.

The optical system L has a halogen lamp 64, mirrors 65 to 67, lens 68, photodetector 69, laser beam emitter 70, polygonal mirror 71 and mirror 72. For the optical system L to scan the document on the glass plate, the halogen lamp 64 and the mirror 65 move from a home position at the left end of the drawing to a right-end position (indicated in broken line in FIG. 2), and the mirrors 66 and 67 move one-half the distance of travel of the halogen lamp 64 and the mirror 65 to the midportion. With the movement of the halogen lamp 64, the light reflected from the document and the mat 63 on the glass plate 62 is converged by the lens 68 and received by the photodetector as a density signal.

The lower side of the document mat 63 has an intermediate color, e.g., gray. While the characters and like image portions on the document are black and the blank portions thereof are white, light of the intermediate color is reflected from the mat and impinges on the photodetector 69. Alternatively, the lower side of the mat 63 can be subjected to a special color treatment or made of a special material, with a special color filter provided in front of the photodetector so that the light from the mat 63 only will be received as light of intermediate color. The photodetector extends axially of the halogen lamp 64 (depthwise of the machine) so that the light can be received wholly along this direction. The document processing to be described is performed for the density signal thus obtained.

A laser beam emitter 70 projects an image beam on the photosensitive drum 73 to be described later in response to an output signal obtained by the document processing procedure to be described later.

The image beam from the laser beam emitter 70 is caused to swing depthwise of the machine by the polygonal mirror 71, which comprises, for example, a hexagonal mirror rotatable in synchronism with the depthwise impingement of light on the photodetector 69. The depthwise swinging image beam is directed to the drum 73 upon reflection at the mirror 72.

The image forming means P comprises, in addition to the photosensitive drum 73, a charge eraser 74, charger 75, developing unit 76, transfer unit 77, separator 78 and cleaner 79 which are arranged around the drum. Arranged along the direction of transport of paper as paper transport means are two paper cassettes 80a, 80b, feed rollers 81a, 81b, a pair of register rollers 82, 83, conveyor belt 84, a pair of discharge rollers 86 and a discharge tray 87. A fixing unit 85 is interposed between the belt 84 and the rollers 86. According to the present embodiment, the optical system L performs the scanning operation twice in sequence. The first operation serves for image processing, for example, for detecting the document size, and the second operation for producing an image copy by means of the laser beam emitter 70.

A signal processing unit operates the laser beam emitter 70 in synchronism with the second feed of copy paper.

Figure 3:
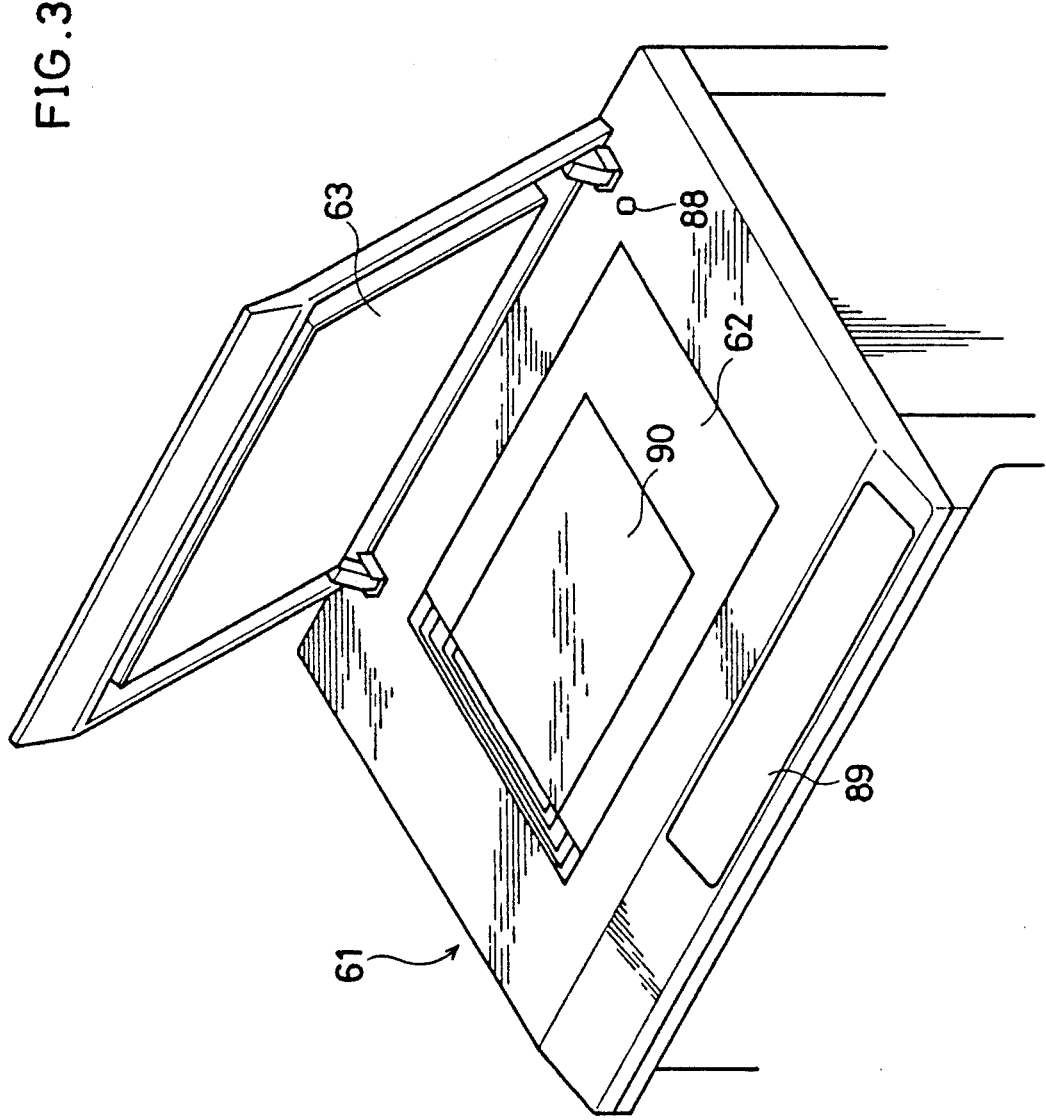
FIG. 3 is a view showing the appearance of the upper portion of the digital copying machine of FIG. 2.

FIG. 3 shows the appearance of the upper portion of the digital copying machine 61 of FIG. 2. The drawing shows a switch 88 which is turned on when the glass plate 62 is covered with the document mat 63 to detect the closing or opening of the mat 63. The detection output is utilized in changing the method of discriminating the density signal as a high- or low-level binary signal to give an output as will be described later. Various function buttons are arranged on an operation panel 89 for the operator to effect a desired mode of document processing. Indicated at 90 is the document placed on the contact glass plate 62.

Figure 1:
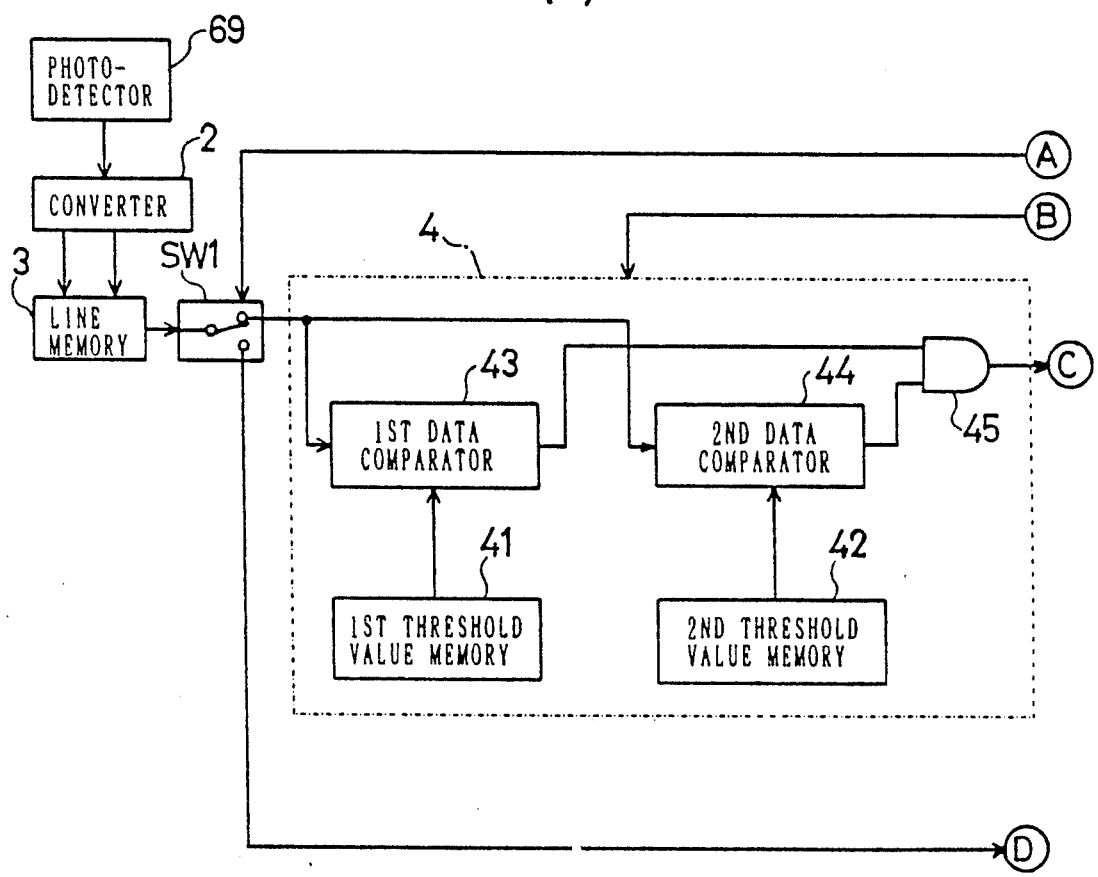
FIGS. 1(a) and 1(b) are an overall block diagram showing an image processing apparatus of the present invention.

FIG. 1 is an exemplary overall block diagram of an image processing apparatus of the invention.

The image processing apparatus comprises the above-mentioned photodetector 69 comprising a CCD image sensor or the like, converter 2 for converting the analog density signal from the photodetector 69 to a digital density signal, line memory 3, discriminating unit 4, memory unit 5, data buffers 6, 7, 9, gate means 8, scanning unit 10 and central control unit 1.

The converter 2 samples the output signal from the photodetector 69 in synchronism with the scanning operation of the optical system L, for example, at 16 MHz to produce a digital density signal of specified bits by conversion. The line memory 3 stores every 8 bits of the density signal, thins out the data to ⅛ and feeds an output to the disriminating unit 4.

A switch SW1 is connected to the discriminating unit 4 during the first scanning operation of the optical system L or to the data buffer 7 during the second scanning operation.

The discriminating unit 4 comprises a first threshold value memory 41, second threshold value memory 42, first data comparator 43, second data comparator 44 and AND circuit 45. The first threshold value memory 41 has stored therein a predetermined first threshold value for discriminating the black color corresponding to the characters, etc. on the document and represented by the density signal from the intermediate color corresponding to the document mat 63 and represented by the signal. The second threshold value memory 42 has stored therein a predetermined second threshold value for discriminating, for example, the intermediate color from the white color corresponding to the background area of the document represented by the density signal. The first and second threshold value memories 41 and 42 have also stored therein another threshold value for changing the density signal extraction level in the case where scanning is done with the aforementioned mat opening-closing sensor switch 88 is off, i.e., with the document mat 63 open. More specifically, while the mat 63 is open, the light from an area other than the document has a somewhat darker color than the light from the document characters and like image areas and produces the blackest color. Accordingly, a threshold value for discriminating the blackest color from black, i.e., the area other than the document from the document area, is stored in the second threshold value memory 42 aside from the above threshold value. In this case, a threshold value which is not exceeded by any density signal level, e.g., the highest level, is stored in the first threshold value memory 41. Alternatively in this case, the circuit construction can be made so changeable that a judgement will be made only from the result of discrimination by the second data comparator 44.

The first comparator 43 compares the density signal received from the line memory 3 via the switch SW1 with the first threshold value and produces a high-level output when the density signal level is lower than the threshold value. The second comparator 44 compares the density signal received from the line memory 3 via the switch SW1 with the second threshold value and produces a high-level output when the density signal level is higher than the second threshold value. The AND circuit 45 feeds a high-level signal to the memory unit 5 only when the outputs from the comparators 43, 44 are high. Thus, the memory unit 5 receives the high-level signal only for an area where the intermediate color corresponding to the document mat 63 is present.

The memory unit 5 comprises shift registers 51, 54, marker memory 52 comprising a RAM or the like, sub-scanning memory 53, frequency divider 55, synchronizing signal frequency divider 56, and switches SW2 to SW5.

The high-level or low-level binary signal (serial signal) from the AND circuit 45 is converted by the shift register 51, for example, to an 8-bit parallel signal as an output. The marker memory 52 stores the parallel signal in synchronism with 2-MHz clock pulses from the frequency divider 55 to be described below.

The switch SW2 is connected to the shift register 51 only during the period of one subscanning operation every eight subscanning operations at least during the first scanning movement and is connected to image processing means 12 in response to a control signal from the central control unit 1 when required during the remaining period. The switch SW3 is connected to the subscanning memory 53 only during the period of one subscanning operation every eight subscanning operations at least during the second scanning movement and is connected to the image processing means 12 in corresponding relation to the action of the switch SW2 during the remaining period. The switch SW4 is connected to the frequency divider 55 only when receiving a high-level signal from the synchronizing signal divider 56 so as to apply the 2-MHz clock pulse signal to the marker memory 52. The switch SW5 is selectively so operated that the 2-MHz clock pulse signal received from the switch SW4 is applies to a data write terminal 521 when the marker memory stores the bianary signal from the discriminating unit 4 and a processing signal from the image processing means 12 or that the clock pulse signal is applied to a data read terminal 522 when the stored data is delivered to the subscanning memory 53 and the image processing means 12. Further the switch SW5 is selectively connected to the data write terminal 521 or the data read terminal 522 as required for image processing as will be described later during the first and second scanning movements.

The subscanning memory 53 stores the parallel signal in an amount corresponding to one scanning operation in the subscanning direction and read out from the marker memory 52. The parallel signal read out from the subscanning memory 53 is delivered from the shift register 54 as converted to the original serial signal. 16 MHz reference clock pulses are fed to the frequency divider 55 and thereby frequency-divided, for example, to ⅛ to give 2-MHz clock pulses. The synchronizing signal frequency divider 56 frequency-divide an input of subscanning synchronizing signal, for example, in ⅛ to produce a high-level signal every eight scanning operations. The density signal delivered from the line memory 3 via the data buffer 7 is produced from the gate means 8 only when the serial signal delivere from the shift register 54 via the data buffer 6 is high. The AND circuit 45 may be replaced by NAND circuit. In this case, the density signal is produced only when the data buffer 6 outputs a low-level signal.

The scanning unit 10 on-off controls the halogen lamp 64 and the drive motor for the optical system L. When the document support table is made movable along with the document thereon instead of the halogen lamp 64, etc., the scanning unit 10 controls the movement of the support table.

The central control unit 1 comprises scanning control means 11 and the above-mentioned image processing means 12, controls the scanning unit 10 and processes as required the data stored in the marker memory 52 as will be described later. The switches SW1 to SW5 are changed-over also under the control of the unit 1. The scanning control means 11 drives the scanning unit 10 twice in sequence. The density signal obtained by the first scanning movement is thinned out, converted to a binary signal by the discriminating unit 4 and then fed to the marker memory 52. The density signal obtained by the second scanning movement is fed as it is to the data buffer 7, with the switch SW1 changed-over.

The signal temporarily read out from the marker memory 52 is processed as specified by the image processing means 12 as will be described later. The processed signal is stored in the marker memory 52 again. Alternatively, the image processing means 12 executes the image processing procedure to be described later based on the data stored in the marker memory 52. For example, the size of the document to be copied is determined from the stored data by a specified processing procedure, or the marker signal for an area of predetermined width inside an edge of the document is rewritten, as will be described in detail later.

The data is read out from the memory 52 and the processed data is stored again in response to a control signal from the central control unit 1.

The data buffer 6 temporarily stores the serial signal from the shift register 54. The data buffer 7 temporarily stores the digital density signal from the line memory 3. These signals are fed from the buffers 6, 7 to the gate means 8 in synchronism. The data buffer 9 temporarily stores the output signal from the gate means 8, and the signal is read out as timed with the second scanning movement of the optical system L and applied to the laser beam emitter 70, whereby a laser beam with luminance corresponding to the output level is projected onto the photosensitive drum 73 via the polygonal mirror 71 and the mirror 72.

The image processing apparatus of the invention will be described with reference to specific embodiments thereof.

Figure 4:
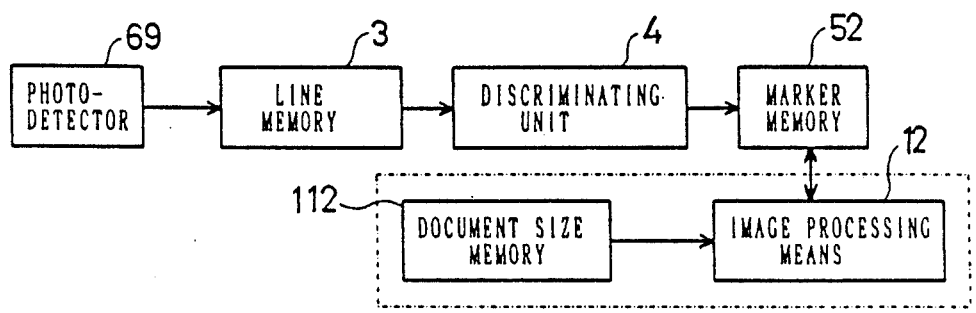
FIG. 4 is a circuit diagram of a first embodiment image processing apparatus of the invention.

FIG. 4 is a circuit diagram showing a first embodiment and is a portion of the overall block diagram of FIG. 1. The density signal obtained by the photodetector 69 at a subscanning speed of 16 MHz is thinned out by the line memory 3 to ⅛ in the case of the present embodiment and fed to the discriminating unit 4. Incidentally, even if the image signal is thinned out to about ⅛ as in the present case, the document area can be discriminated from the other area satisfactorily.

Figure 5:
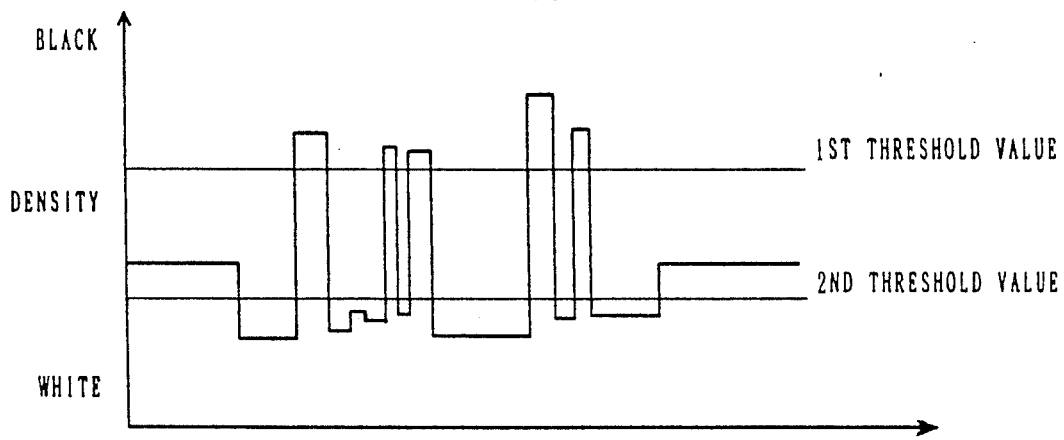
FIG. 5 is a diagram showing a density signal fed to a discriminating unit 4.

FIG. 5 shows an example of density signal fed to the discriminating unit 4. Plotted as abscissa in FIG. 5 is the direction of subscanning as compressed to ⅛, vs. the density as ordinate. Varying densities represent white for the background area of the document, black for the image area thereof, and an intermediate color for the document mat 63. The discriminating unit 4 produces a high-level signal only when the density signal has a portion representing the intermediate color, and the signal is stored in the next marker memory 52. Incidentally, in view of the case wherein the document locally has a portion of intermediate color, the signal stored in the marker memory 52 is so processed in advance that when the adjacent signal portions are found to be continuous in a predetermined mode, this is interpreted as representing the document mat 63.

Figure 6:
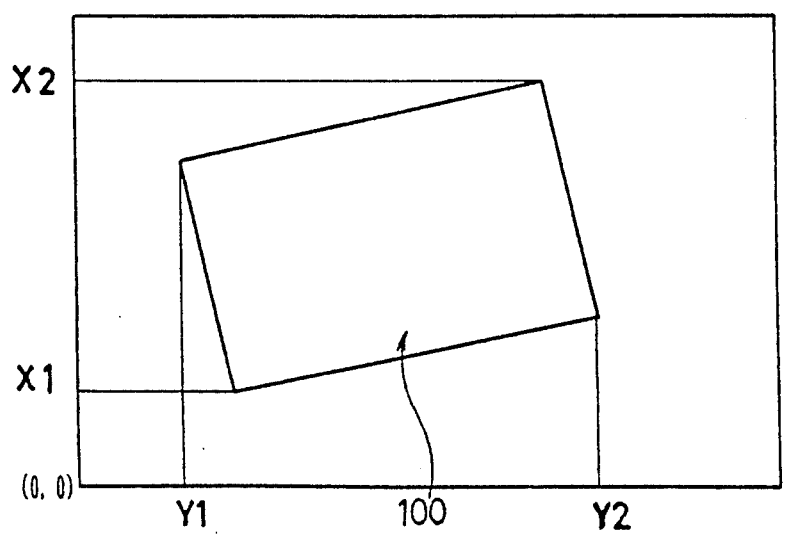
FIG. 6 is a diagram showing an example of data stored in a marker memory 52.

FIG. 6 shows the contents of the marker memory 52. The memory has Y-axis in the main scanning direction and X-axis in the subscanning direction. Indicated at 100 is the area of a document, and the remainder is the area of the document mat 63 (or contact glass plate 62). The size of the document is detected by the image processing means 12 from the data thus stored in the marker memory 52. The document size is detected, for example, by scanning the interior of the memory shown in FIG. 6 to locate the four corners of the document area 100 and determining the size of the area including the corners from the positions of the corners.

Figure 7:
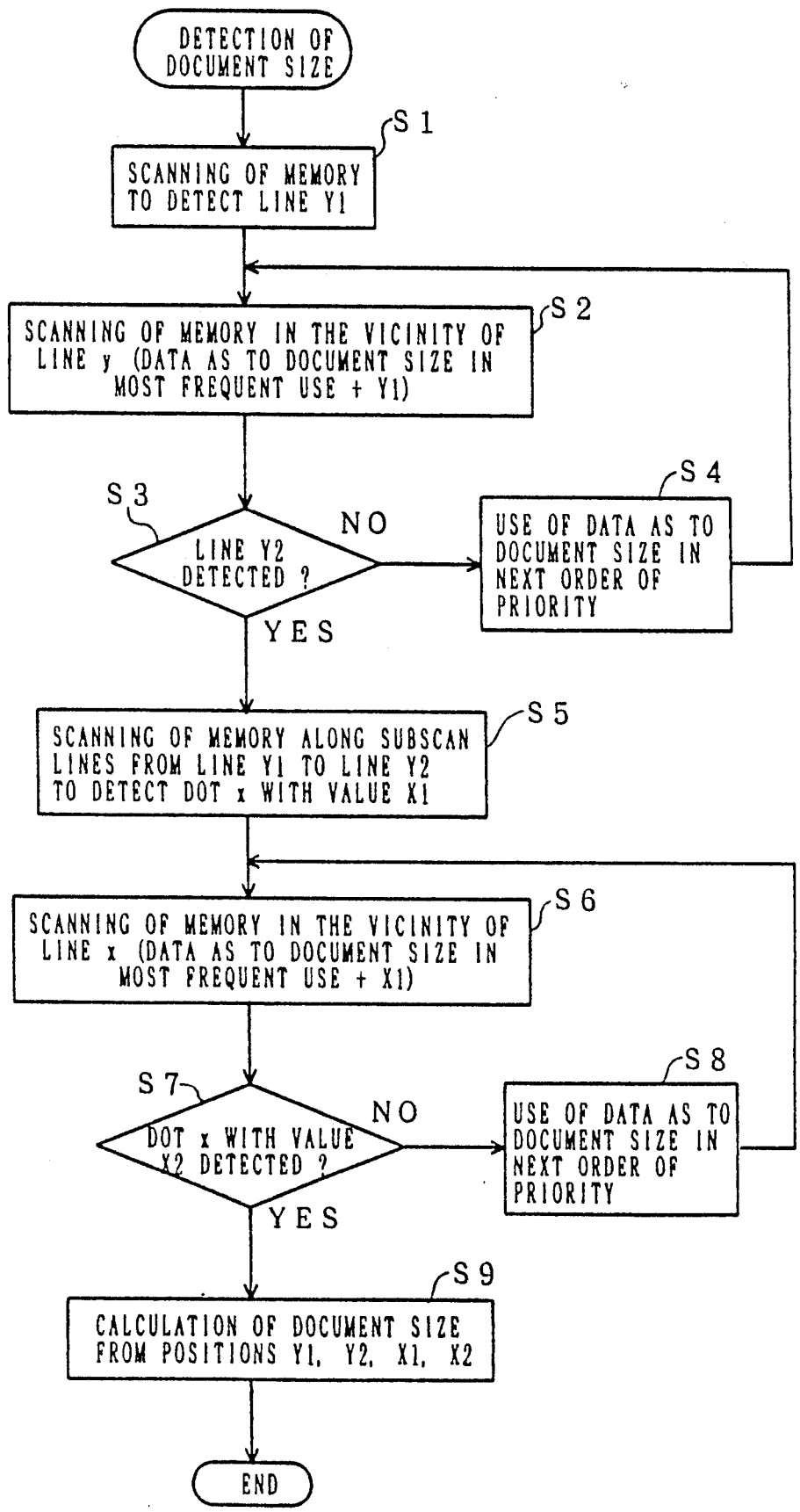
FIG. 7 is a flow chart showing an image processing procedure.

FIG. 7 shows an example of method of determining the document size.

As seen in FIG. 4, the image processing means 12 has connected thereto document size memory means 112 which comprises a ROM or the like and which is utilized for executing the following image processing procedure. The memory means 112 has stored therein data as to the paper cassettes 80a, 80b, etc., i.e., as to document sizes, with an order of priority given according to the order of decreasing frequency of use as empirically determined. The priority order may be given in the order of increasing or decreasing document size.

The document size determining procedure will be described with reference to FIG. 7.

First, the interior of the memory shown in FIG. 6 is repeatedly scan from a reference point (0, 0) in the subscanning direction. The output obtained from the document mat area is a high-level signal. When line Y1 is subscanned, a low-level signal is obtained as an output for the first time. The line Y1 is stored in an unillustrated memory of the image processing means 12 as the position (specified by x-address and y-address) of the first corner (step S1). The data as to the document size most frequently used is then read out from the document size memory means 112 and added to Y1 to determine line y, and some lines in the vicinity of the line y are subscanned (step S2). For example, with respect to the sum y, line (y−dy) to line (y+dy) are subscanned to detect line Y2 fulfilling the contemplated condition. dy is a value corresponding, for example, to several lines. The line Y2 can be detected with higher reliability by subscanning several lines preceding and also following the line of the calculated value y. More specifically, while these lines are being subscanned with a low-level signal present in the resulting output, the low-level signal becomes no longer available from a particular subscan line. This line is the line Y2, which is then stored as the position of the second corner (YES to the inquiry of step S3). In step S3, on the other hand, there is a case where a high-level signal is present in the outputs of all the subscan lines in the above range (when the document is of smaller size), or the low-level signal is obtained from these subscan lines (when the document is of larger size) (NO for step S3). The following step is then taken. In the former case, the data as to a document size smaller than the above document size and in the next order of priority is read out from the document size memory means 112 by the image processing means 12, followed by the same procedure as above for detecting the second corner (step S4). Alternatively in the latter case, the data as to a document size larger than the above document size and in the next order of priority is read out from the document size memory means 112, followed by the same procedure as above for detecting the second corner (step S4).

After the position of the second corner has been determined, detection of the third corner is started. For the detection of the third corner, the memory shown is scanned along subscan lines from the line Y1 toward the line Y2, and the dot x giving an output of low-level signal in each scan line is compared with like dot x in another scan line. For example, the addresses of the dots x obtained from each two successive subscanning operations are compared to determine the dot x of the smallest value x. This value, X1, is stored as the position of the third corner (step S5). When the document area is inclined in a direction opposite to the direction of inclination shown in FIG. 6, the position of the lower end corner is determined in the same manner as above.

When the position of the third corner has been thus determined, the data as to the document size in the first order of priority is read out from the document size memory means 112 and added to the value X1. For the determination of the fourth corner, the memory is scanned in the direction of main scanning. More specifically, with respect to the sum x obtained by adding the size data to the value X1, the range of from line (x−dx) to line (x+dx) is scanned in the main direction, and the value x of the last main scan line giving the low-level signal, i.e., X2, is stored as the position of the fourth corner (step S6, YES to step S7). Like dy, dx is a value corresponding, for example, to several lines. The value X2 can be detected with higher reliability by scanning several lines preceding and following the line of the calculated value x. When X2 fulfilling the contemplated condition can not be obtained, the same procedure as above is repeated with use of the data as to a smaller or larger document size in the next order of priority as already described (NO to step S7, and steps S8 and S6).

In this case, the document size already found to fufill the condition in step S3 may be read out in preference so as to shorten the time required to determine the document size.

After the positions Y1, Y2, X1, X2 of the four corners have been determined in this way, the document size having the area with the four corners is determined by calculation (step S9).

The document size is calculated geometrically or by determining the vertical and horizontal lengths from the positions of the four corners. In the case where the document area is not inclined unlike the one shown in FIG. 6, the subscan lines are identical in respect of the address of dot x. In this case, the position where the dot x is obtained first is stored as the corner X1.

Documents are generally rectangular, so that the size of a particular document can be determined by detecting three of the four corners, or two corners on a diagonal. Further when the document used is in accordance with the Japanese Industrial Standards (JIS), the size of the document can be specified by determining Y2 with Y1 serving as the origin line. In this case, even if Y1 is not set to the reference line, that is, even if the rear end of the document is set to a postion on the glass plate 62 corresponding to Y2 so as to copy the document on paper one size larger than the document, the document size can be determined merely by detecting Y2 only. Thus, the document size can be determined from the data stored in the marker memory 52 by a processing method meeting the need.

Figure 8:
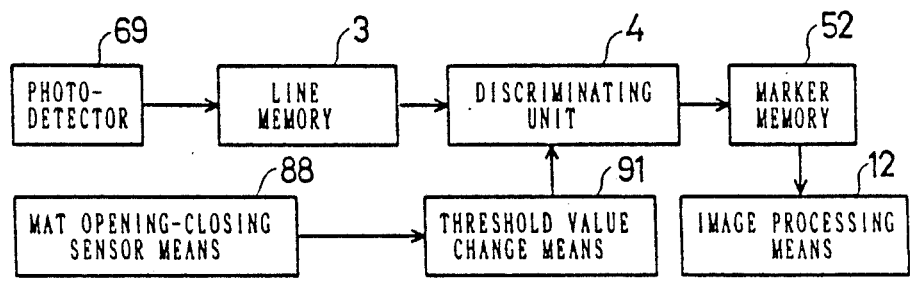
FIG. 8 is a circuit diagram of a second embodiment of image processing apparatus of the invention.

FIG. 8 shows a second embodiment of image processing apparatus of the invention in which the procedure in the discriminating unit 4 is changed to process image in accordance with which the optical system performs a scanning movement with the document mat left closed, or with the document mat left opened.

FIG. 8 shows a portion of the overall block diagram of FIG. 1. Throughout FIGS. 1 and 8, like parts are designated by like reference numerals. Indicated at 88 is sensor means for detecting whether the contact glass plate 62 is covered with the document mat 63. When the plate is covered with the mat 63 in its closed state, the procedure already described with reference to the first embodiment is executed by the discriminating unit 4. In this case, the area other than the document area 100 is the area of intermediate color of the document mat 63.

However, when books or thick documents are copied or when usual documents are copied urgently or carelessly, it is likely that the optical system will perform a scanning movement with the document mat 63 left unclosed. If the discriminating unit 4 then makes a judgement according to the first embodiment, the density signal obtained for the area of the document mat 63 is likely to be interpreted in error.

Mat open and closed signals are fed to threshold value change means 91. Upon receiving the open signal, the change means 91 changes the threshold values in the first and second threshold value memories 41, 42 of the discriminating unit 4 as already stated.

Figure 9:
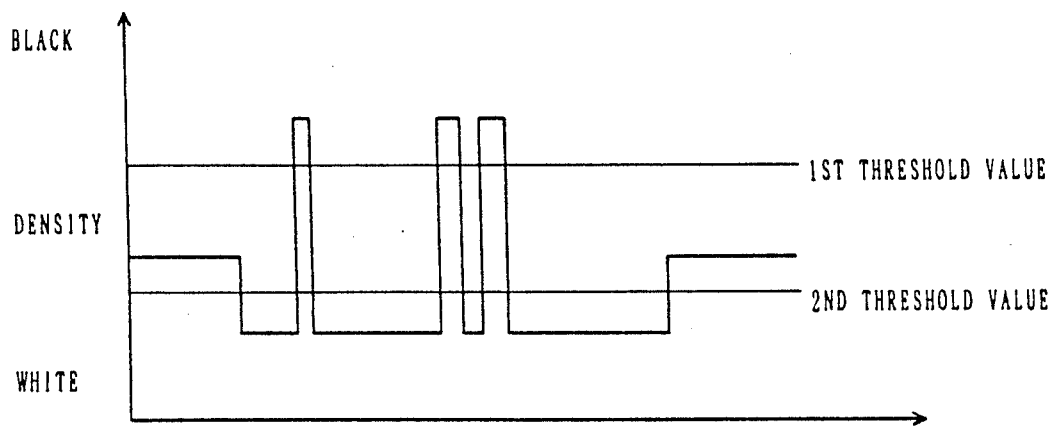
FIG. 9 is a diagram showing an example of density signal when a document mat is closed.
Figure 10:
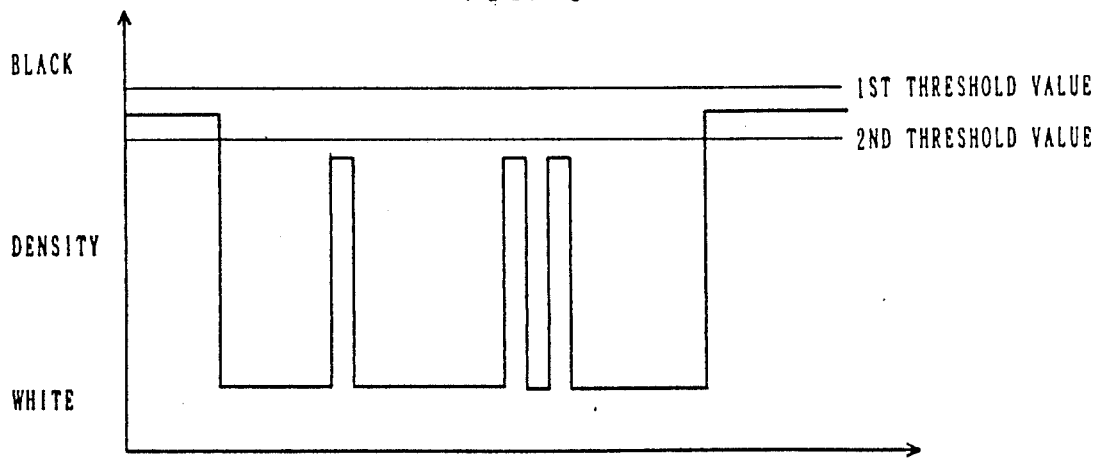
FIG. 10 is a diagram showing an example of density signal when the document mat is open.

FIGS. 9 and 10 show exmaples of density signals when the mat 63 is in the closed state and in the open state, respectively. In FIG. 9, the area of the document mat 63 affords an output representing the intermediate color. In the case of FIG. 10, the light of the halogen lamp 64 passes through the contact glass plate 62 without any reflection and therefore gives an output of blacker level than that obtained from the image area of the document.

Accordingly, the threshold value change means 91 sets the first threshold value to the highest level, and the second threshold value to a level intermediate between the level of the density signal from the document image area and the level of the signal from the contact glass portion. With the threshold values thus changed, the discriminating unit 4 produces a high-level signal for the area other than the document. The output singal is stored in the marker memory 52 and thereafter subjected to the same image processing procedure as in the first embodiment.

Figure 11:
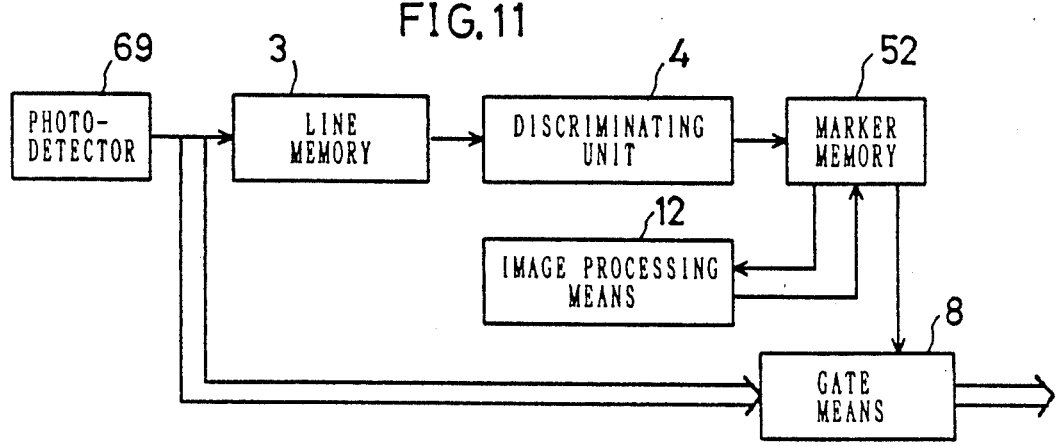
FIG. 11 is a circuit diagram of a third embodiment of image processing apparatus of the invention.

FIG. 11 is a circuit diagram showing a third embodiment of image processing apparatus of the present invention. The embodiment is so adapted that the signal in the document area of the marker memory is rewritten over a specified width inside the edge of this area.

The image forming apparatus of the invention is so adapted that the optical system performs a scanning operation twice, and the signals obtained from the two scanning operations are produced from the data buffers 6, 7 in synchronism. Accordingly, the signal obtained by subjecting the density signal from the first scanning operation to image processing and the image signal obtained by the second scanning operation are delivered from the gate 8 in synchronism. Consequently, an image of the original is transferred in position on copy paper which is fed in synchronism with the second scanning operation.

With this apparatus, the optical system is so controlled as to start scanning from the home position, whereas it is likely that the scanning operation will not be started accurately from the home position but will be initiated at a slightly different position owing to a backlash of the unillustrated motor for driving the optical system, deterioration of other members or other cause. Furthermore, the secondary operation to feed the copy paper to the photosensitive drum is not effected always with proper timing when checked microscopically, for example, for some reason associated with the register roller 83 or the like.

Figure 12:
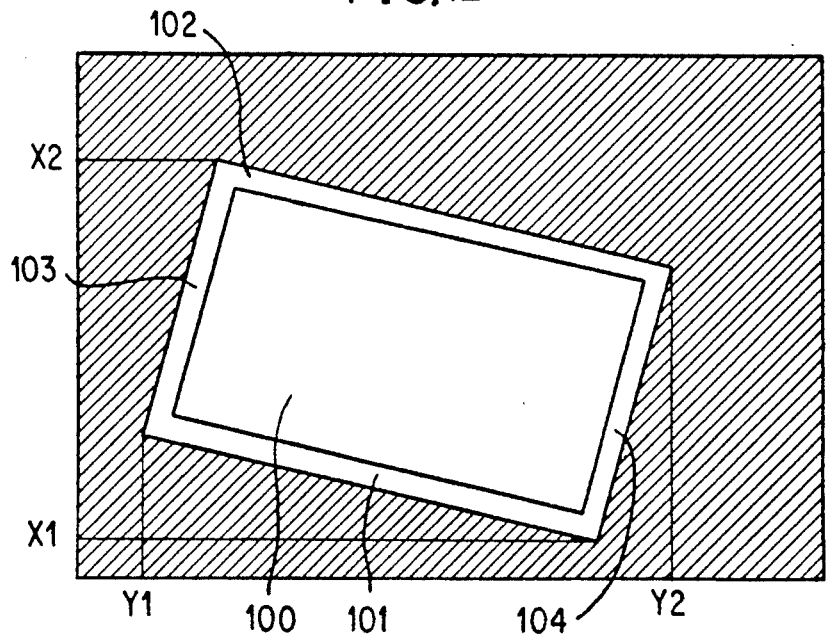
FIG. 12 is a diagram showing an example of data stored in the marker memory 52.

Consequently, the two image signals obtained become displaced from each other, or the image signal is not delivered in proper timing relation with the secondary paper feed operation. It is then likely that characters or the like at one end of the document will be positioned outside the copy paper when copied. This impairs the photosensitive properties of the drum. More specifically, with digital copying machines or the like, the photosensitive drum is negatively charged, for example, to about −700 V, and the character bearing portion is negatively charged to about −100 V. No problem will arise if copy paper is accurately fed to this character bearing portion and then subjected to a high positive voltage for image transfer. However, if the transfer voltage is applied directly to the character bearing portion which is charged to −100 V, this portion of the drum becomes positively charged and will no longer be charged negatively, presenting difficulties in developing operation. The circuit shown in FIG. 11 eliminates this drawback. In FIGS. 1 and 11, like components are designated by like reference numerals. With reference to the drawing, the image processing means 12 processes the signal stored in the marker memory 52 in the following manner. In response to a control signal from the central control unit 1, the image processing means 12 first scans the marker memory 52 in the forward direction of subscanning from the reference position or from the corner position Y1 determined in the above first and second embodiments, to change the stored contents from low level to high level over a specified width from the x-address position where the stored signal changes from high level to low level, e.g., over an area corresponding to a specified number of x-addresses. The contents thus rewritten are stored in the marker memory 52 again. Indicated at 101 in FIG. 12 is the edge area thus changed from low level to high level, i.e., from the document area 100 to the area of the document mat 63.

Next, the marker memory is subscanned in a direction opposite to the above, i.e., in the direction of decreasing x-address value, to change the stored contents from low level to high level over a specified width from the x-address position where the stored signal changes from high level to low level, e.g., over an area corresponding to a specified number of x-addresses. The contents thus rewritten are stored in the marker memory 52 again. Indicated at 102 is the edge area changed from low level to high level, i.e., from the document area 100 to the area of the mat 63.

In this way, the signal in the document edge area is rewritted with respect to the subscanning direction.

Subsequently, the stored signal is written with respect to the direction of main scanning. The memory is efficiently scanned in the forward direction of main scanning from the reference position to the x-address of maximum value, or from the x-address of the line Y1 to the x-address of the line X1, to change the stored contents from low level to high level over a specified width from the y-address position where the stored signal changes from high level to low level, e.g., over an area corresponding to a specified number of y-addresses. The contents thus rewritten are stored in the marker memory 52 again. Indicated at 103 is the edge area changed from low level to high level, i.e., from the document area 100 to the area of the mat 63. Finally, the marker memory is scanned in the reverse direction of main scanning, i.e., in the direction of decreasing y-address value, to change the stored contents from low level to high level over a specified width from the y-address position where the stored signal changes from high level to low level, e.g., over an area corresponding to a specified number of y-addresses. The contents thus rewritten are stored in the marker memory 52 again. Indicated at 104 is the edge area changed from low level to high level, i.e., from the document area 100 to the area of the mat 63.

When the signal is rewritten by the above procedure in the case where the document area 100 is inclined at an angle as shown in FIG. 12, the edge area 103, for example, will be rewritten along with the edge area 101 in an overlapping manner. It is then likely that the edge area 101 will become larger than is predetermined in width. This may be precluded, for example, by limiting the subscanning and main scanning ranges for rewriting with use of the aforementioned four corner positions, or by storing the address of each rewriting edge area in another memory and collectively rewriting the stored signal after the overall rewriting area has been determined.

The signal rewritten by the above procedure is guided to the gate means 8, which in turn processes the image signal obtained by the second scanning operation to block the portion of the image signal corresponding to the area of the document mat 63 and the overall edge area 101 to 104.

Through the image processing procedure of the present embodiment, the edge area of specified width inside the document area is handled as the area of the document mat 63, so that even if some displacement or timing difference occurs as stated above, the image signal can be confined to the area of copy paper to the greatest possible extent.

Figure 13:
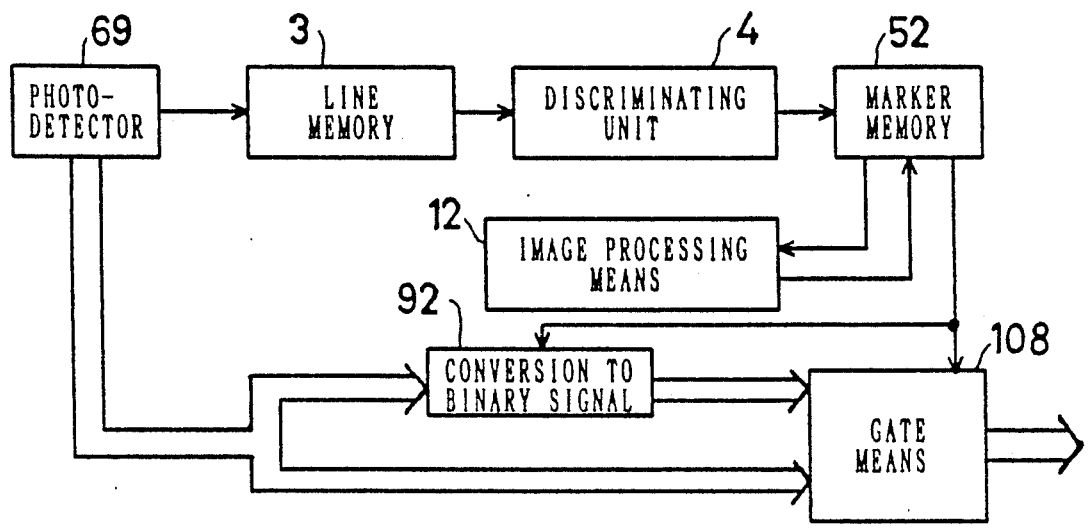
FIG. 13 is a circuit diagram of a fourth embodiment of image processing apparatus of the invention.
Figure 14:
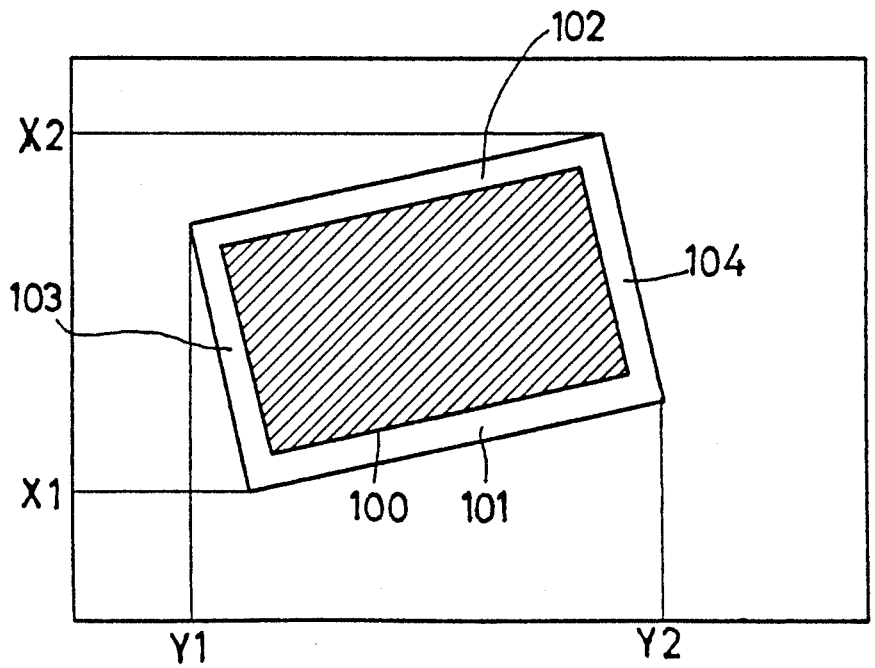
FIG. 14 is a diagram showing an example of data stored in the marker memory 52.

FIG. 13 is a circuit diagram showing a fourth embodiment of the present invention, wherein the stored signal is rewitten over an area of specified width inside the edge of the document area, and the image signal of the edge area is processed to give a binary signal.

According to the third embodiment, the image signal for the document edge area is collectively blocked by the gate means 8, whereas some documents bear characters or the like in the edge area. It is desired that the image signal representing such characters be output in one form or another. FIG. 13 shows a portion of the block diagram of FIG. 1. In FIGS. 1 and 13, like components are designated by like reference numerals. With reference to FIG. 13, the image processing means 12 scans the marker memory 52 to execute the image processing procedure of the third embodiment. The document edge area signal of high level as rewritten is read out from the marker memory 52 in timed relation with the second scanning operation of the optical system and fed to gate means 108 (corresponding to the gate means 8 of FIG. 1) and a circuit 92 for conversion to a binary signal. The conversion circuit 92 has a threshold level for separating a density signal representing the character or like image area of the document from a density signal for the document mat 63, i.e., the first threshold level shown in FIG. 5 or 9, and converts the image signal received while the marker memory 52 is delivering the high-level signal to a binary signal according to the threshold level. On the other hand, while the low-level signal is being output, the circuit 92 is out of operation, delivering no output signal. Incidentally in the case of FIG. 10, conversion to a binary signal is effected according to whether the input image signal has a level between the second threshold level and an intermediate level therebelow.

When the output of the marker memory 52 is at the high level, the gate means 108 passes the output of the conversion circuit 92 therethrough in preference, whereas when the memory output is low, the gate means directly delivers the image signal.

Through the gate operation thus effected, the image signal for the document area 100 is passed as it is through the gate means 108 and fed to the laser beam emitter 70. For the edge area 101 to 104, on the other hand, the image signal, when having a specified level representing characters or the like, is output on conversion to a signal of predetermined level, with the other portion of the image signal blocked.

In this way, the image signal representing characters or the like is delivered at the predetermined level. This assures higher image reproducibility than when the edge area signal is entirely blocked.

In the foregoing description of the flow chart of FIG. 7, the marker memory is scanned first in the subscanning direction, whereas conversely, the memory may be scanned first in the main scanning direction.

When the binary conversion circuit 92 of the fourth embodiment is adapted to deliver an output only for the edge area wherein the signal is rewritten, the threshold value for the conversion can be an intermediate level only.

Next, a fifth embodiment of the invention will be described with reference to FIGS. 1 and 15.

First with reference to FIG. 15, (a), a document having, for example, the characters "123456" written thereon is marked with an area A with a marking pen or the like and is then scanned.

The scanning unit 10 effects the first scanning operation in the main direction and subdirection from the home position, and the density signal from the photodetector 1 is fed to the converter 2, which samples the signal at 16 MHz to prepare an 8-bit digital signal.

The mark made with the marking pen or the like has a density of substantially definite, intermediate level between black and white.

The digital signal containing portions of intermediate level as shown in FIG. 15, (b) is delivered from the converter 2 to the discriminating unit 4, which produces as a marker signal an output of high level for the digital signal portions of the intermediate level between the first and second threshold values or an output of low level for the other signal portion as seen in FIG. 15 (c).

The marker signal is then fed to the shift register 51 and covnerted to an 8-bit parallel signal based on a clock signal. At this time, the output of the shift register 51 is applied to the marker memory 52 via the switch SW2, and the 2-MHz clock signal from the frequency divider 55 is fed to the data write terminal 521 of the marker memory 52 via the switches SW4 and SW5. With the marker memory 52 brought into condition for writing under the control of the central control unit 11, the marker signal as converted to the parallel signal is stored in the marker memory 52 in synchronism with the 2-MHz clock signal which is fed in response to every subscanning signal frequency-divided to ⅛.

Thus, the marker signal obtained by one scanning operation in the subscanning direction is stored in the unit of every 8 bits. After the marker signal obtained from one subscanning operation has been stored, the marker signal from the next to the seventh subscanning operations is not stored (for thinning out) by the action of the switch SW4, and the marker signal from the eighth subscanning operation is stored. Accordingly, the marker memory 52 can be of 1/64 the capacity needed for storing the whole quantity of marker signal obtained from the main and subscanning operations. The marked area is detectable even when the marker signal is stored every eight scanning operations because the width of the mark made by the marking pen or the like is much greater than the spacing between the scan lines.

After the first document scanning operation has been completed, the scanning unit 10 is so controlled by the scanning control means 11 that the optical system returns to the home position. During the period of the return from the scanning completed position to the scanning start position, the image processing means 12 is connected to the marker memory 52 by the switches SW2 and SW3. The image processing means 12 reads out the parallel signal (data) stored in the marker memory 52 for image processing.

For example, when subscanning is effected along a broken line C as shown in FIG. 15, (a), and the high-level signal from the discriminating unit 4 contains low-level signals of small width during a period T1 as seen in FIG. 15, (c), these signals are collectively regarded as a hight-level signal, and the data stored in the marker memory 52 and corresponding to the period T1 is so modified as shown in FIG. 15, (f).

More specifically stated, when subscanning is done along broken lines D, C and E shown in FIG. 15, (a), the discriminating unit 4 produces the outputs of FIG. 15 (d), (c) and (e). The image processing means 12 then reads out from the marker memory 52 items of data corresponding to the outputs of FIG. 15, (d), (c) and (e), compares these items of data, and modifies the stored data so that a high-level signal is available for the entire period T1 as shown in FIG. 15, (f).

When the mark is in the form of a frame surrounding a specified area of the document, the framed area is regarded as entirely marked, and the data stored in the marker memory 52 and corresponding to the area is modified to the high level.

When the second document scanning operation is started, the marker memory 52 is connected to the subscanning memory 53 by the switch SW3, and the 2-MHz clock signal from the frequency divider 55 is applied to the marker memory 52 via the switches SW4 and SW5. The digital signal obtained from the converter 2 by the second document scanning operation is fed to the gate means 8 via the switch SW1.

At the same time, the marker memory 52 is brought into condition for reading under the control of the central control unit 1. The stored data corresponding to one subscanning operation is delivered from the marker memory 52 to the subscanning memory 53 and is further read out from the memory 53 in synchronism with the 2-MHz clock signal. The data is fed to the shift register 54 and delivered therefrom as converted to the original serial signal. The signal is then applied to the gate means 8 via the data buffer 6. When the serial signal is at high level, the digital signal from the converter 2 is delivered from the gate 8 to the data buffer 9.

After the data in the first row in the subscanning direction has been completely output, the same stored data as in the first row is read out from the subscanning memory 53 in synchronism with the 2-MHz clock signal and fed to the shift register 54, which applies the original serial signal to the gate means 8. The gate means 8 delivers the digital signal to the data buffer 9 in the same manner as above. The operation of delivering the same stored data from the subscanning memory 53 is repeated eight times. Since the marker signal for the second to seventh rows in the subscanning direction is not stored during the first document scanning operation, the data corresponding to these subscanning operations is interpolated with the stored data in the first row of subscanning in this way. The spacing between the subscanning lines is much smaller than the marked area, so that the marked area will not shift from characters or the like even if the marker signal for the second to the seventh rows of subscanning is interpolated with the data stored for the first row of subscanning.

After the same stored data has been delivered from the subscanning memory 53 eight times, the stored data corresponding to the next subscanning operation is delivered from the marker memory 52 to the subscanning memory 53. The data is read out from the memory 53 repeatedly eight times. The procedure thus repeated is executed for all the subscanning operations.

The marked area may be masked by blocking the digital signal from the converter 2 by the gate means 8 when the serial signal from the data buffer 6 is high.

According to the embodiment described above, the characters or the like in the marked area on the document can be selected for outputting or blocking to conduct a copying operation based on the resulting output. Furthermore, the stored data is modified during the period from the completion of the first document scanning until the start of the second document scanning, and the digital signal obtained by the second document scanning operation is delivered from or blocked by the gate means 8 according to the modified data. Thus, there is no need to provide a period of time for modifying the stoared data.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An image processing apparatus wherein a document on a document support table and an optical system are moved relative to each other for scanning to read the image of the document as a density signal, and the read signal is processed as required, the apparatus comprising a document mat so colored that when the document support table is covered with the mat, the read signal represents an intermediate color, discriminating means for judging whether the density signal represents the intermediate color to produce a binary signal, memory means having a memory capacity of 1/n based on the density signal, write control means for causing the binary signal to be written in the memory means in synchronism with the scanning movement, and means for determining the size of the document from the contents of the memory means.

2. An image processing apparatus wherein a document on a document support table and an optical system are moved relative to each other for scanning to read the image of the document as a density signal, and the read signal is processed as required, the apparatus comprising a document mat so colored that when the document support table is covered with the mat, the read signal represents an intermediate color, means for detecting whether the document mat is in a closed state covering the document support table or in an open state not covering the table, first discriminating means for judging whether the density signal represents the intermediate color to produce a binary signal, second discriminating means for judging whether the density signal is a black signal representing a density higher than the density of the document area to produce a binary signal, memory means having a memory capacity of 1/n based on the density signal, write control means for causing the binary signal to be written in the memory means in synchronism with the scanning movement, change-over means for feeding the output of the first discriminating means to the memory means when the document mat is in the closed state or feeding the output of the second discriminating means to the memory means when the mat is in the open state, and means for determining the size of the document from the contents of the memory means.

3. An apparatus as defined in claim 1 or 2 wherein the size determining means determines the document size from the contents of the memory means and prestored data as to the sizes of documents.

4. An apparatus as defined in claim 3 wherein the prestored data as to the sizes of documents is stored in a predetermined order of priority.

5. An apparatus as defined in claim 4 wherein the predetermined order of priority is the order of frequency of use of the documents.

6. An apparatus as defined in claim 4 wherein the predetermined order of priority is the order of decreasing document size.

7. An apparatus as defined in claim 4 wherein the predetermined order of priority is the order of increasing doucment size.

8. An apparatus as defined in claim 1 or 2 wherein the size determining means scans the interior of the memory means to determine means scans the interior of the memory means to determine corner of the document and thereby determine the document size.

9. An apparatus as defined in claim 8 wherein the document corners to be determined by the size determining means is four in number.

10. An apparatus as defined in claim 8 wherein the document corners to be determined by the size determining means is three in number.

11. An apparatus as defiend in claim 8 wherein the document corners to be determined by the size determining means is two in number.

12. An apparatus as defined in claim 8 wherein the size determining means determines the first of the corners at one end of the document by scanning the contents of the memory means, estimates the position of another one of the corners at the other document end from the first corner and the prestored document size data, and determines said another corner by scanning the contents in the vicinity of the estimated position.

13. An image processing apparatus wherein a document on a document support table and an optical system are moved relative to each other for scanning to read the image of the document as a density signal, and the read signal is processed as required, the apparatus comprising a document mat so colored that when the document support table is covered with the mat, the read signal represents an intermediate color, discriminating means for judging whether the density signal represents the intermediate color to produce a binary signal, memory means having a memory capacity of 1/n based on the density signal, write control means for causing the binary signal to be written in the memory means in synchronism with the scanning movement, and signal rewriting means for rewriting a portion of the contents of the memory means corresponding to an area of specified width inside the edge of the docment.

14. An image processing apparatus wherein a document on a document support table and an optical system are moved relative to each other for scanning to read the image of the document as a density signal, and the read signal is processed as required to obtain an output, the apparatus comprising a document mat so colored that when the document support table is covered with the mat, the read signal represents an intermediate color, control means for effecting the scanning operation twice, discriminating means for judging whether the density signal obtained by the first scanning operation represents the intermediate color to produce a binary signal, memory means having a memory capacity of 1/n based on the density signal, write control means for causing the binary signal to be written in the memory means in synchronism with the scanning operation, signal rewriting means for rewriting a portion of the contents of the memory means corresponding to an area of specified width inside the edge of the document, read control means for reading out the stored contents of the memory means in synchronism with the second scanning operation, binary conversion means for produding a binary signal from the density signal obtained by the second scanning operation as separated into a black signal and a signal other than the black signal, and gate means for passing the output of the binary conversion means therethrough while the memory contents for the intermittent color signal area are being read out and passing therethrough the density signal obtained by the second scanning operation during the other period.

15. An apparatus as defined in claim 14 wherein the gate means passes therethrough the output of the binary conversion means only while the memory contents for the area of the specified width inside the document edge are being read out.

16. An image processing apparatus wherein a document on a document support table and an optical system are moved relative to each other for scanning to read the image of the document as a density signal, and the read signal is processed as required to obtain an ouput and form an image, the apparatus comprising control means for effecting the scanning operation twice, discriminating means for judging whether the density signal obtained by the first scanning operation represents a marking intermediate color to produce a binary marker signal, memory means having a memory capacity of 1/n based on the density signal, write control means for causing the marker signal to be written in the memory means in synchronism with the scanning operation, modifying means for modifying the marker signal stored in the memory means to a marker signal corresponding to the intermediate color over the entire mark area of the memory means, read control means for reading out the modified contents of the memory means in synchronism with the second scanning operation, and gate means for outputting therethrough the density signal obtained by the second scanning operation according to the marker signal read out by the read control means.

17. An apparatus as defined in claim 16 wherein the gate means passes therethrough the density signal obtained by the second scanning operation while the marker signal corresponding to the intermediate color is being output.

18. An apparatus as defined in claim 16 wherein the gate means blocks the density signal obtained by the second scanning operation while the marker signal corresponding to the intermediate color is being output.

* * * * *